US008688155B2

(12) United States Patent
Residori

(10) Patent No.: US 8,688,155 B2
(45) Date of Patent: Apr. 1, 2014

(54) SYNCHRONIZATION METHODS FOR SINGLE-FREQUENCY SIMULCAST MOBILE RADIO COMMUNICATION NETWORKS

(75) Inventor: Francesco Residori, Verona (IT)

(73) Assignee: Selex Communications S.p.A., Genoa (IT)

( * ) Notice: Subject to any disclaimer, the term of this patent is extended or adjusted under 35 U.S.C. 154(b) by 1123 days.

(21) Appl. No.: 12/531,486

(22) PCT Filed: Mar. 12, 2008

(86) PCT No.: PCT/IB2008/050889
§ 371 (c)(1),
(2), (4) Date: Sep. 15, 2009

(87) PCT Pub. No.: WO2008/110992
PCT Pub. Date: Sep. 18, 2008

(65) Prior Publication Data
US 2010/0103990 A1    Apr. 29, 2010

(30) Foreign Application Priority Data

Mar. 15, 2007    (IT) .............................. TO2007A0194

(51) Int. Cl.
*H04B 7/00*    (2006.01)
(52) U.S. Cl.
USPC ........... 455/502; 455/211; 455/307; 455/327; 370/323; 370/315
(58) Field of Classification Search
None
See application file for complete search history.

(56) References Cited

U.S. PATENT DOCUMENTS 5,059,926 A    10/1991 Karczewski
6,973,121 B1 *    12/2005 Eberlein et al. ............... 375/211

FOREIGN PATENT DOCUMENTS

| IT | 01248029 B | 1/1995 |
| WO | 00/55996 A1 | 9/2000 |
| WO | 2005/117433 A1 | 12/2005 |
| WO | 2007/028459 A1 | 3/2007 |

OTHER PUBLICATIONS

International Search Report, mailed Jul. 28, 2008, for PCT/IB2008/050889, pp. 1-3.

* cited by examiner

*Primary Examiner* — Fayyaz Alam
*Assistant Examiner* — Mohammed Rachedine
(74) *Attorney, Agent, or Firm* — Seed IP Law Group PLLC

(57) ABSTRACT

What is described is a circuit arrangement and a method for synchronizing the communication signals between a repeater station (S) of a single-frequency simulcast radio communication network (N) and user terminals (T) with respect to a universal reference signal sent by a central station (M) of the network (N) communicating with the repeater station (S). A frequency offset is determined between a universal frequency reference signal received from the central station (M) and a local frequency reference signal of the repeater station (S), and in the repeater station (S) there are provided a first feedback control loop for supplying a signal for controlling a local oscillator of the repeater station (S) on the basis of the said determined frequency offset, and a second direct control loop for supplying a signal for compensating the residual synchronization difference of the local oscillator (16) to which the transmitter device of the station (S) is tuned.

18 Claims, 3 Drawing Sheets

SYNCHRONIZATION METHODS FOR SINGLE-FREQUENCY SIMULCAST MOBILE RADIO COMMUNICATION NETWORKS

The present invention relates to the field of analogue and digital mobile radio communication in a single-frequency simulcast (simultaneous broadcast) network, and specifically to the aspect of the frequency synchronization of the radio repeater stations of a simulcast network.

Simulcast networks are widely used at the present time, particularly for the infrastructure configuration for professional mobile radio communication systems, since they offer extended radio coverage of a territory, high-quality connections and the use of value-added services without requiring an increase in the radio frequencies, by contrast with cellular systems whose architecture requires a large number of available radio channels.

Professional mobile radio communication systems provide communication services (such as telephony, data transmission and radio positioning to closed user groups and meet the communication requirements of public or private organizations whose structure requires connections between a control centre and units distributed over a territory.

Over a number of years there has been an increasing demand for public or private-access radio communication networks for radio communication applications for professional purposes, e.g. from public security forces, public utility operators, transport companies or simply businesses which own fleets of vehicles and which need to manage large numbers of employees operating on a mobile basis within local, regional or national areas.

Simulcast networks provide a simple and comprehensive response to these requirements, being highly adaptable to any relief configuration of the territory to be covered.

A simulcast network is exemplarily illustrated in FIG. 1, and comprises a master station connected via a first channel (at the frequency $f_1$) to a plurality of satellite repeater stations or slaves (or to a plurality of secondary masters, possibly with a plurality of hierarchical levels, which connect numerous remote repeater stations) which simultaneously transmit the same signal (and receive signals from the user terminals) over a second common radio channel (at the frequency $f_2$) in corresponding coverage areas.

Each repeater station covers a portion of the total coverage area of the network. The coverage areas of the individual repeater stations can overlap, thus creating areas in which a mobile transceiver terminal receives signals of comparable power from two or more stations simultaneously.

To ensure correct operation and good performance, simulcast networks require accurate frequency synchronization. This is because, in simulcast networks which are not accurately synchronized, a mobile terminal receiving signals from two or more repeater stations at comparable power levels suffers from degradation of the signal quality: in the case of an analogue signal, the signal to noise ratio becomes worse, while in the case of a digital signal the errors in the received bits increase, thus worsening the bit error rate (BER).

It is not possible to achieve accurate synchronization between the repeater stations by using high-stability oscillators at each station (quasi-synchronous networks), and the preferred solution has been to broadcast a synchronization tone to the individual oscillators via a dedicated channel (at a frequency in the UHF range).

For example, U.S. Pat. No. 5,059,926 resolves the problem of frequency synchronization by using counters and a set of dedicated signalling which are exchanged periodically between the master station and the slave stations of the network, in such a way that the oscillators of the slave stations are synchronized with the oscillator of the master station.

However, this method is inefficient, since it has the disadvantage of requiring a set of dedicated signals for the purpose of synchronizing all the oscillators. This increases the resource demands of the use of the radio connections by reducing the available bandwidth for the useful signal, and makes it impossible to carry out synchronization when the network is busy with the transmission of user-generated traffic.

The patent IT 1 248 029 in the name of Prod-El describes an innovative synchronization method, using the frequency of the amplitude- or angle-modulated carrier of the useful signal retransmitted by the repeater stations to the transceiver terminals, so that the signals carrying the user traffic are used directly without the need for additional signalling.

This enables the whole available bandwidth to be used in a more efficient way to transmit useful information, thus increasing the transmission speed, or to provide new value-added services.

The object of the present invention is to provide a further improvement to simulcast networks operating with carrier synchronization, in order to make the frequency synchronization of a whole network extremely fast, which is an advantageous characteristic for analogue signal processing and essential for digital signal processing.

According to the present invention, this object is achieved by means of equipment having the characteristics claimed in Claim 1, and a method having the characteristics claimed in Claim 10.

The invention also proposes a repeater station and a single-frequency simulcast radio communication network as claimed.

Briefly, the present invention provides a synchronization method, adapted for simulcast networks with repeater stations connected to a master station via a radio link and operating with phase or frequency modulation, of the analogue or digital type, based on the precise recovery of a synchronization reference from the signal sent by the master station. This is achieved by providing the repeater station with a first synchronization control loop adapted to provide a control signal for the local oscillator of the repeater station, and a second synchronization control loop adapted to supply a signal to compensate the residual difference in synchronization between the local oscillator and the master oscillator directly at the stage of signal transmission to the user terminals.

Further characteristics and advantages of the invention will be disclosed more fully in the following detailed description of one embodiment of the invention, provided by way of non-limiting example, with reference to the attached drawings, in which.

Figure 1:
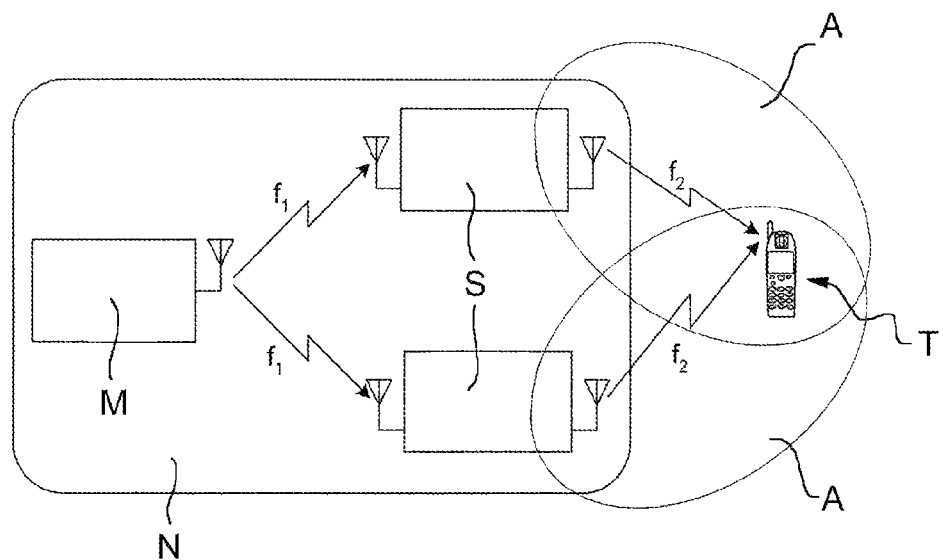
FIG. 1, is a schematic illustration of a single-frequency simulcast radio communication network.

FIG. 1 shows a configuration of a conventional single-frequency simulcast radio communication network N, comprising a master station M and a plurality of slave repeater stations S, connected to the master station directly (as shown) or through further hierarchical levels of rebroadcasting stations for more complex networks with larger territorial coverage. Each of the repeater stations S has a radio coverage area A in which a user's mobile radio terminal T may be located.

The master station M can transmit signals to the slave repeater stations S via a first channel at a first frequency $f_1$, and the slave stations simultaneously rebroadcast the same signal over the corresponding coverage areas A via a second channel at a second frequency $f_2$, which is common to the whole network.

The master station contains an autonomous frequency reference, and the slave stations recover the synchronization from the master station by using the carrier reference at the frequency $f_1$. The synchronization method is effective with any analogue or digital modulation, which may be of the phase or frequency type.

In particular, the types of modulation considered for the operation of the network are frequency modulation (FM) for analogue signals and 4-level frequency modulation (4-FSK, Frequency Shift Keying) for digital signals.

Conveniently, the chosen type of digital modulation is 4-FSK modulation with a transmission speed of 6000 symbols per second, since the characteristics of multi-level (4-level) continuous phase modulation (CPM) for packet transmission can provide a constant-envelope signal and optimize the use of the available bandwidth.

Figure 2:
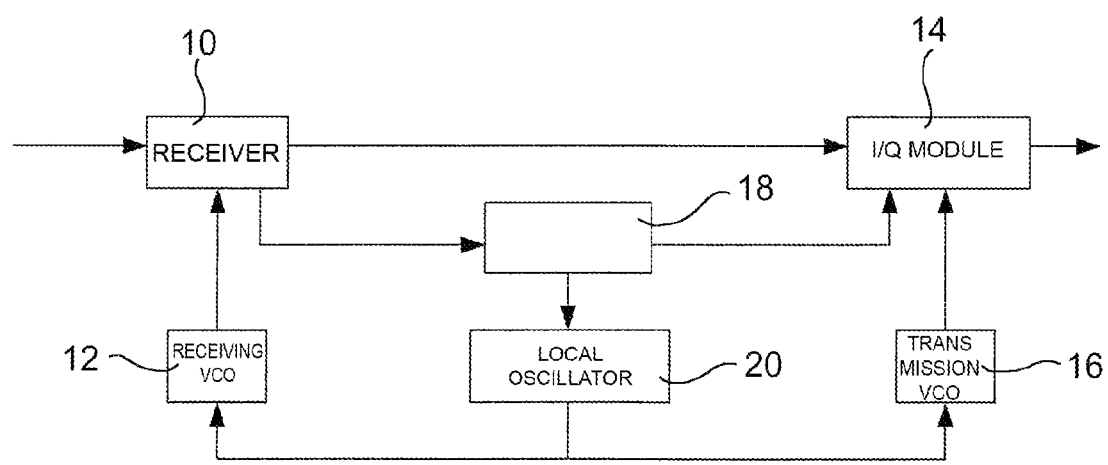
FIG. 2 is a schematic illustration of the circuit architecture of a repeater station of the network of FIG. 1, with synchronization recovery from the carrier according to the invention.

FIG. 2 shows the parts of the circuit architecture of a slave repeater station S which relate to the aspects of recovering synchronization from the signal received from the master station M.

The station comprises a radio frequency receiver device 10 adapted to demodulate the analogue or digital signal received from the master station M, tuned to the nominal frequency ($f_1$) of the radio connection with the master station by means of a corresponding voltage-controlled oscillator (VCO) 12.

The receiver device 10 is coupled to an I/Q modulator device 14, which is tuned to the nominal frequency ($f_2$) of the radio connection with the user terminals T by means of a corresponding voltage-controlled oscillator (VCO) 16, and is adapted to modulate the signal to be transmitted to the aforesaid terminals. If the received and demodulated signal is analogue, the modulator 14 carries out an FM modulation at the frequency $f_2$. If the received and demodulated signal is digital, the modulator 14 carries out a 4-FSK modulation around the frequency $f_2$, having reconstructed the waveform of the digital signal after the decoding of the symbols.

A circuit arrangement 18 for recovering the synchronization reference signal is designed to receive the analogue or digital signal sent by the master station M through the receiver 10, and is adapted to send a first signal for adjusting a local oscillator 20 of the repeater station and a second signal for adjusting the synchronization supplied to the modulator 14.

In its turn, the local oscillator 20 is coupled to the voltage-controlled oscillator 12 to synchronize the receiver 10 (the receiving branch) and to the voltage-controlled oscillator 16 to synchronize the modulator 14 (the transmission branch).

Figure 3:
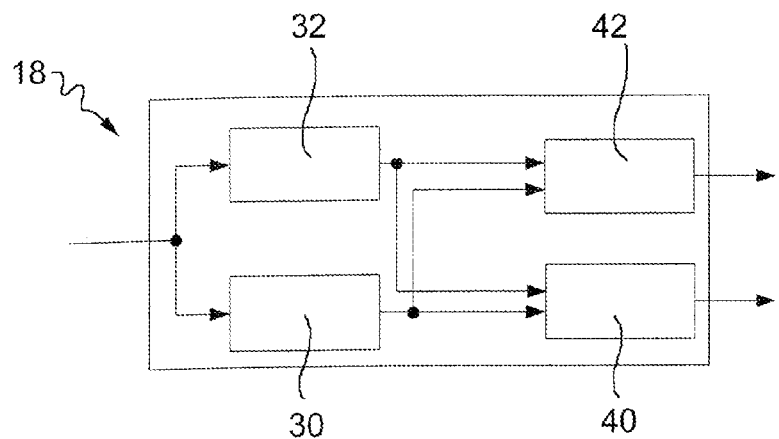
FIG. 3 is a circuit diagram of a synchronization recovery device according to the invention.

The synchronization recovery arrangement 18, shown in detail in FIG. 3, includes a first module 30 for estimating the frequency offset between a received analogue signal and the synchronizing oscillator 12 of the receiver, and a second module 32 for estimating the frequency offset between a received digital signal and the synchronizing oscillator 12 of the receiver, these modules being connected in parallel.

Each of the modules 30 and 32 has its output coupled to a circuit module for "slow" synchronization control 40 and to a circuit module for "fast" synchronization control 42, which are, respectively, adapted to send the said first control signal for the local oscillator 20 and the said second fast (residual) control signal to the modulator 14.

Figure 4:
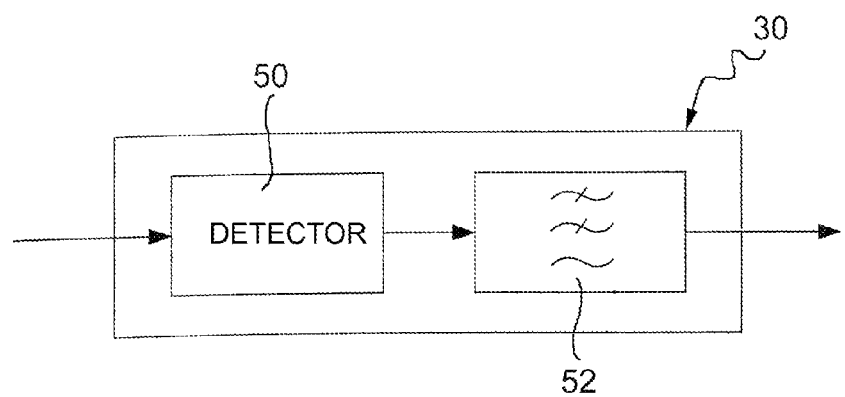
FIG. 4 is a diagram of a circuit module for estimating the frequency offset for an analogue signal.
Figure 5:
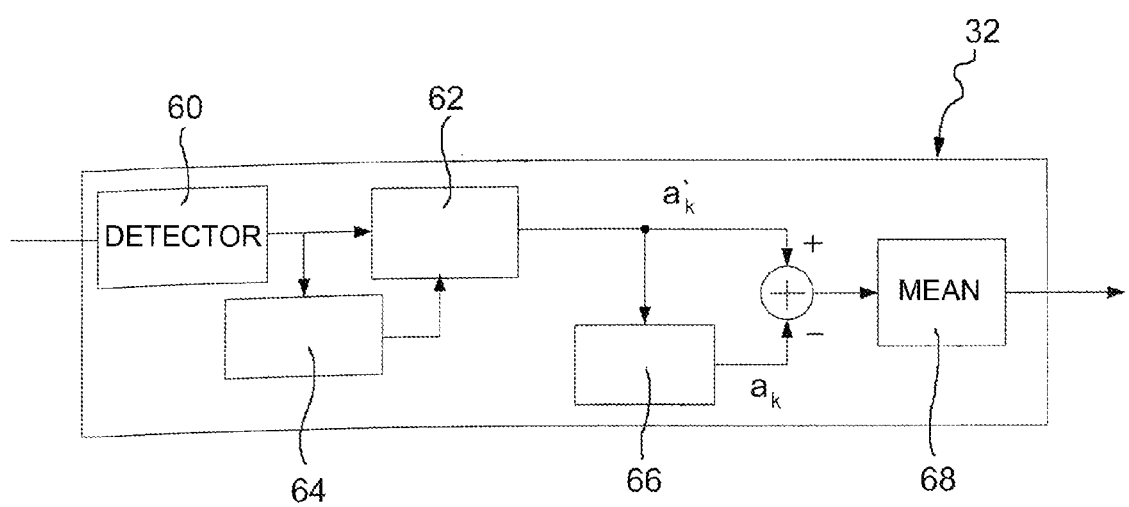
FIG. 5 is a diagram of a circuit module for estimating the frequency offset for a digital signal.

With reference to FIGS. 4 and 5, these show the details of the circuit architecture of the frequency offset estimation modules.

The frequency offset estimation module 30 for analogue signals (FIG. 4) comprises an analogue signal detector circuit 50 and, downstream of this, a low-pass filter 52.

The frequency offset estimation module 32 for digital signals (FIG. 5) comprises a digital signal detector circuit 60 and, downstream of this, a down-converter circuit 62 for converting the signal to symbols for each packet received, this circuit being controlled by means of a timing recovery circuit 64. An adder circuit connected downstream of the down-converter 62 is adapted to receive the symbols received from each packet on a non-inverting input, and is adapted to receive the expected symbols for the same packet on an inverting input, the latter symbols being produced by means of a symbol regeneration circuit 66, in such a way that the difference between the symbols is determined. Finally, the output of the adder circuit is connected to the input of a circuit 68 for determining the mean of the symbols, this circuit being adapted to supply a corresponding frequency offset estimate signal.

Figure 6:
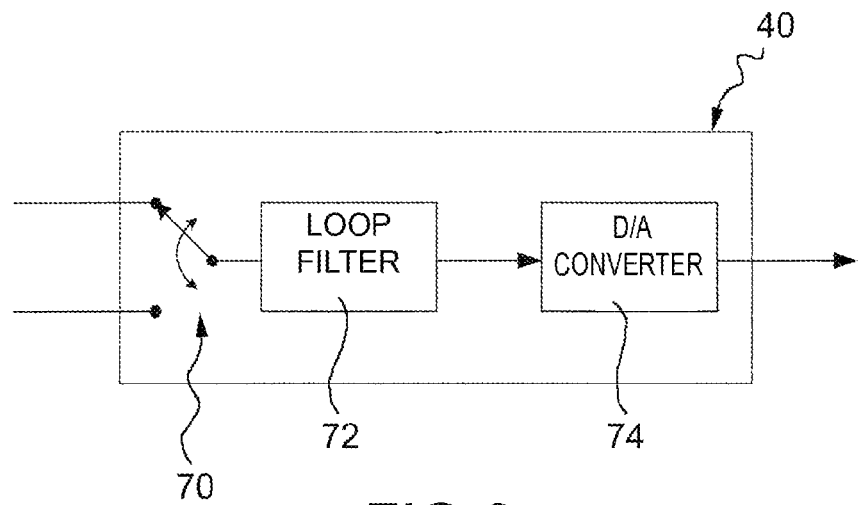
FIG. 6 is a diagram of a circuit module for "slow" synchronization control.
Figure 7:
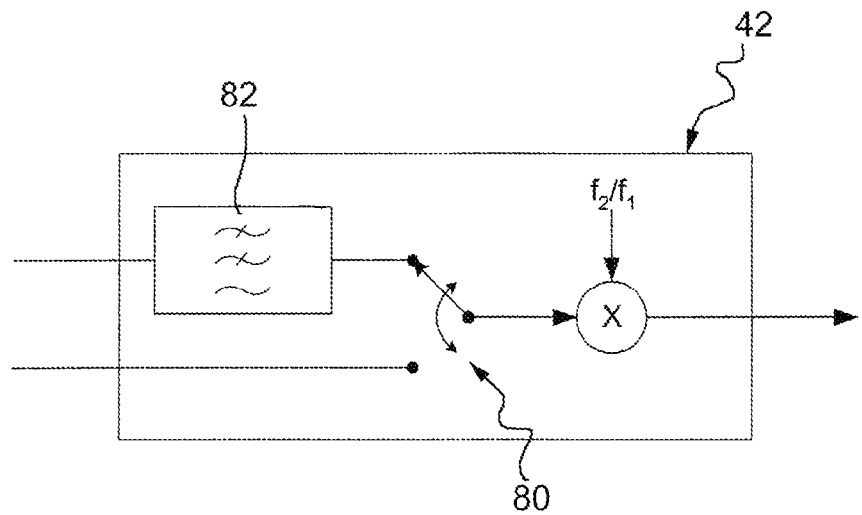
FIG. 7 is a diagram of a circuit module for "fast" synchronization control.

With reference to FIGS. 6 and 7, these show the details of the circuit architecture of the synchronization control modules.

The "slow" synchronization control circuit module 40 includes a switch device 70 for switching between a first and a second input channel, these channels carrying the frequency offset estimate signals for the analogue and digital signals respectively, and, downstream of this device and connected in series, a loop filter 72 for the feedback controlled circuit and an output D/A converter 74.

The "fast" synchronization control circuit module 42 includes a switch device 80 for switching between a first and a second input channel, these channels carrying the frequency offset estimate signals for the analogue and digital signals respectively, and a downstream multiplier circuit. A smart low-pass filter 82, whose poles vary with a variation in the number of packets received per unit of time, is placed in the digital signal input channel.

In operation, the synchronization reference signal recovery arrangement 18 uses the frequency demodulated signal present at the receiver device 10 to recover the reference signal.

The frequency demodulated signal contains the information indicating the extent of the frequency offset of the reference oscillator of the repeater station with respect to the master station. This information is estimated by means of calculation algorithms executed by the frequency offset estimation modules 30 and 32 in different ways, according to whether an analogue or a digital signal is received.

The module 30 estimates the frequency offset between the received signal and the signal sent by the VCO 12 on the basis of a received analogue signal. More precisely, it carries out narrow-band filtering around the continuous component of the demodulated signal, and the calculated value provides the necessary information for estimating the frequency offset.

The module 32 estimates the frequency offset between the received signal and the signal sent by the VCO 12 on the basis of a received digital signal. More precisely, for each received packet (comprising n symbols) it determines the mean amplitude of the received values $a_k'$ with respect to the expected values $a_k$. If the distribution of the symbols $a_k$ had a zero mean, in other words if the expected value of the $a_k$ were zero ($E[a_k]=0$), the same method used for the analogue signal could be applied here, but since $E[a_k]$ is not zero, and changes from one packet to the next, a different method must be used. The estimate is then calculated by finding the difference between the received symbols $a_k'$ and the expected symbols $a_k$ within each packet. Any deviation in frequency modifies the position of the received symbols, and the mean of this offset produces the information to be used for recovering the offset.

For the detailed description of the frequency offset estimation process, we will consider a modulating signal which may be:

of the analogue type $$m(t) = B \cdot \sin(2\pi f_m \cdot t)$$

where $f_m$ is the instantaneous frequency of the modulating signal m(t); or of the general CPM type $$m(t) = \sum_k a_k g(t - kT)$$

where $$a_k \in \{\pm 1, \pm 3, \pm M-1\}$$

in which $a_k$ represents the symbols and g(t) represents the waveform of the symbols.

When the signal m(t) is frequency modulated, the instantaneous carrier frequency can be expressed in the form $$f(t) = f_0 + hm(t)$$

where $f_0$ is the band centre frequency and h is a modulation index.

The phase φ of the carrier is modulated by the integral of m(t). In particular, we can write:

$$\varphi(t) = \varphi_0 + K_f \int_{-\infty}^{t} m(\tau) d\tau$$

where $\phi_0$ is the initial phase of the carrier, while $K_f$ is the modulation index.

If A denotes the amplitude of the carrier, the modulated signal can be written thus:

$$s(t) = A \cos[2\pi f_0 t + \phi(t)]$$

Clearly, the following relation is true:

$$s(t) = A \cdot \mathrm{Re}\{e^{j\phi(t)} e^{j2\pi f_0 t}\}$$

and therefore the representation of this signal in terms of the in-phase and quadrature components is:

$$s(t) = x(t)\cos(2\pi f_0 t) - y(t)\sin(2\pi f_0 t)$$

where:

$$x(t) = A \cdot \cos[\phi(t)]$$

$$y(t) = A \cdot \sin[\phi(t)]$$

Assuming that in the repeater station the reference oscillator has a frequency error with respect to the frequency of the master station, the VCO 12 of the receiving branch will create a demodulation of the signal s(t) in the receiver 10 with a frequency carrier $f_0 + \Delta f_0$, and therefore with a frequency imprecision of $\Delta f_0$.

This would produce a signal affected by error which is combined with the received signal in the following way:

$$v(t) = A \cdot \mathrm{Re}\{e^{j\phi(t)} \cdot e^{j2\pi \cdot \Delta f_0 \cdot t}\} = A \cdot \mathrm{Re}\{e^{j(\phi(t) + 2\pi \cdot \Delta f_0 \cdot t)}\}$$

At the output of the frequency discriminator in the receiver 10, this residual oscillation is translated into a constant which moves the continuous component of the modulating signal m(t).

It should be noted that the frequency discriminator can be constructed alternatively in the form of an analogue filter, or by digitally processing the in-phase components (I) and quadrature components (Q) of the signal.

Figure 8:
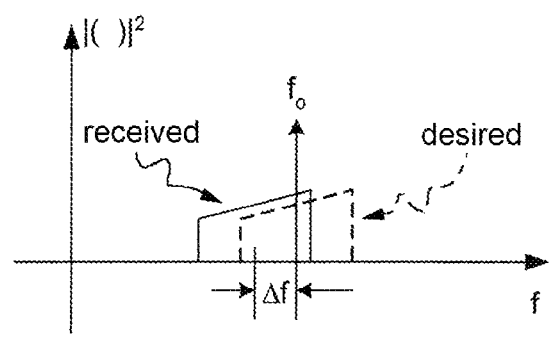
FIG. 8 is an illustration of the effects of frequency offset on the radio carrier broadcast by a repeater station.

If the receiving system were ideal, this continuous component would cause no problems, but since the filters have a limited operating band, any offset $\Delta f_0$ (see FIG. 8) would create distortion in the received signal and a frequency offset in the radio carrier rebroadcast by the repeaters.

As mentioned above, the frequency offset estimates produced by the module 30 or 32 are sent to the inputs of the synchronization control modules 40 and 42.

The "slow" and "fast" synchronization control modules 40 and 42 are arranged to execute corresponding calculation algorithms in parallel, in order to generate corresponding control signals for the local oscillator 20 and for the modulator 14.

The frequency offset estimate is used by the "slow" control module 40 to correct the tuning voltage of the internal local oscillator 20 of the repeater station, thus compensating the reference frequency variations due to the ageing of the quartz and temperature variations, and keeping the intermediate frequency (IF) signal centred with respect to the quartz filters present in the receiver. The control of the local oscillator 20 is therefore substantially of the feedback type, and causes the oscillator to oscillate at the frequency of the reference oscillator of the master station.

The frequency of the local oscillator 20 is then used by the VCO 12 of the receiving branch to determine the reception frequency of the demodulator of the receiver device 10 and by the VCO 16 of the transmission branch to determine the transmission frequency for the I/Q modulator.

The frequency offset estimate is used by the "fast" control module 42 to calculate a frequency compensation value which is used by the I/Q modulator to rectify its incorrect operating frequency when the "slow" control algorithm has not reached convergence.

In the case of an analogue signal, the frequency offset estimate is scaled by a factor $f_2/f_1$ to allow for the different frequencies of the two VCOs 12 and 16. In the case of a digital signal, the frequency offset estimate shows a stepped variation for the first packet received, while in the case of continuous transmission it is averaged over a plurality of packets by means of the low-pass filter 82 and is scaled by the factor $f_2/f_1$ to allow for the different frequencies of the two VCOs 12 and 16.

The control of the modulator 14 is therefore substantially of the feedforward type.

Naturally, the principle of the invention remaining the same, the forms of embodiment and details of construction may be varied widely with respect to those described and illustrated, which have been given purely by way of non-limiting example, without thereby departing from the scope of protection of the present invention as defined by the attached claims.

The invention claimed is:

1. A circuit to synchronize communication signals between a repeater station of a single-frequency simulcast radio communication network and user terminals with respect to a universal frequency reference signal sent by a central station of the network communicating with the repeater station, the circuit comprising:
   an oscillator circuit adapted to produce a local frequency reference signal for a tuning receiver of the station to a first operating frequency for transmitting the signals received from the central station, and for a tuning transmitter of the station to a second operating frequency for transmitting the signals to the user terminals;
   means for determining a frequency offset between the universal frequency reference signal received from the central station and the local frequency reference signal;
   first frequency control means, for tuning the oscillator circuit to the frequency of the universal reference signal, and arranged to vary its oscillation frequency on the basis of the determined frequency offset, in a first feedback control loop configuration; and
   second frequency control means arranged to provide the tuning transmitter with a signal for compensating a residual difference in synchronization between the oscillation frequency of the oscillator circuit, with respect to which the tuning transmitter is tuned, and the frequency of the universal reference signal, in a second direct control loop configuration.

2. The circuit according to claim 1, in which the universal frequency reference signal is a carrier wave of an angle-modulated analog communication signal between the central station and the repeater station.

3. The circuit according to claim 1, in which the universal frequency reference signal is a carrier wave of an angle-modulated digital communication signal between the central station and the repeater station.

4. The circuit of claim 1, comprising a first module for determining a frequency offset of an analog communication signal and a second module for determining a frequency offset of a digital communication signal, these modules being adapted to receive a corresponding demodulated communication signal at their inputs.

5. The circuit according to claim 4, in which the module for determining a frequency offset of an analog communication signal comprises a low-pass filter for narrow-band filtering around a continuous component of the demodulated signal.

6. The circuit according to claim 4, in which the module for determining a frequency offset of a digital communication signal comprises:
   means for converting the digital signal to symbols, for each packet received;
   means for comparing a sequence of received symbols of each packet with a corresponding sequence of expected symbols for the same packet; and
   means for determining the mean offset of the symbols of the sequence.

7. The circuit according to claim 6, in which the first frequency control means comprises:
   means for switching between a first analog input channel and a second digital input channel, these channels carrying frequency offset estimate signals for analog and digital communication signals, respectively;
   a loop filter downstream of the switching means; and
   a digital to analog converter in series with the loop filter.

8. The circuit according to claim 6, in which the second frequency control means comprises:
   means for switching between a first analog input channel and a second digital input channel, these channels carrying frequency offset estimate signals for analog and digital communication signals, respectively;
   downstream of these switching means, a multiplier circuit for scaling the estimated offset as a function of the ratio between the first and second transmission operating frequencies.

9. The circuit according to claim 8, in which the digital input channel comprises a low-pass filter.

10. A Method for synchronizing communication signals between a repeater station of a single-frequency simulcast radio communication network and user terminals with respect to a universal frequency reference signal sent by a central station of the network communicating with the repeater station, the repeater station comprising an oscillator circuit for producing a local frequency reference signal for tuning receiver means of the station to a first operating frequency for transmitting signals received from the central station, and for tuning transmitter means of the repeater station to a second operating frequency for transmitting signals to the user terminals, characterized in that it includes the operations of:
   determining a frequency offset between the universal frequency reference signal received from the central station and the local frequency reference signal;
   varying an oscillation frequency of the oscillator circuit on the basis of the determined frequency offset, in order to tune this circuit to the frequency of the universal reference signal, in a first feedback control loop configuration; and
   providing the transmitter means with a signal for compensating residual difference in synchronization between the oscillation frequency of the oscillator circuit with respect to which these means are tuned and the universal reference signal frequency, in a second direct control loop configuration.

11. The method according to claim 10, in which the universal frequency reference signal is a carrier wave of an angle-modulated analog communication signal between the central station and the repeater station.

12. The method according to claim 10, in which the universal frequency reference signal is a carrier wave of an angle-modulated digital communication signal between the central station and the repeater station.

13. The method according to claims 10, in which the determination of a frequency offset is of an offset of an analog communication signal and comprises narrow-band low-pass filtering around a continuous component of the demodulated signal.

14. The method claim 10, in which the determination of a frequency offset is of an offset of a digital communication signal and comprises:
   conversion of the digital signal to symbols, for each packet received;
   comparison of a sequence of received symbols of each packet with a corresponding sequence of expected symbols for the same packet; and
   determination of a mean offset of the symbols of the sequence.

15. The method of claim 10, in which tuning of the oscillation frequency of the oscillator circuit to the frequency of the universal reference signal comprises:
   selection of an input channel carrying the frequency offset estimate signal with the communication signal, from a first input channel for analog communication signals and a second input channel for digital communication signals;

frequency locking to the universal reference signal; and digital/analog conversion of the locked universal reference signal.

16. The method according to claim 10, in which compensation of the residual synchronization difference between the oscillation frequency of the oscillator circuit and the frequency of the universal reference signal comprises:

selection of an input channel carrying the frequency offset estimate signal with the communication signal, from a first input channel for analog communication signals and a second input channel for digital communication signals; and scaling of the estimated offset as a function of the ratio between the first and second transmission operating frequencies.

17. A repeater station of a single-frequency simulcast radio communication network, comprising a circuit according to claim 1.

18. A single-frequency simulcast radio communication network, comprising a plurality of repeater stations, each of the plurality of repeater stations including a circuit according to claim 17.

* * * * *